United States Patent

[11] 3,630,699

[72] Inventor  Robert T. Catlin
               Trumbull, Conn.
[21] Appl. No. 854,654
[22] Filed     Sept. 2, 1969
[45] Patented  Dec. 28, 1971
[73] Assignee  Remington Arms Company, Inc.
               Bridgeport, Conn.
               Continuation-in-part of application Ser. No.
               703,931, Feb. 8, 1968. This application
               Sept. 2, 1969, Ser. No. 854,654

[54] METHOD FOR PRODUCING ARMORED SABER SAWS
     12 Claims, 18 Drawing Figs.
[52] U.S. Cl. ........................................................ 51/293,
                                                51/309, 76/112
[51] Int. Cl. ...................................................... B24d15/02,
                                                    B24d 17/00
[50] Field of Search ........................................... 76/112 X;
                                                  51/293, 309

[56]                References Cited
              UNITED STATES PATENTS
2,569,054  9/1951  Herzog ........................... 76/112
2,826,941  3/1958  Kolesh ............................ 76/112
3,063,310  11/1962 Connoy .......................... 76/112
3,117,472  1/1964  Mingus et al. .................. 76/112
3,357,462  12/1967 Craven ........................... 76/112

Primary Examiner—Donald J. Arnold
Attorney—Raymond J. McElhannon

ABSTRACT: Method for the quantity production of armored saber saws from a long flexible strip of a base metal, consisting preferably of a heat treatable steel or alloy steel, which comprises: progressively punching out portions of said strip along one edge thereof at equispaced intervals to form the upper profiles of a series of saber saws comprising shank and blade portions of each, thereafter progressively coating the upper edges of said blade portions with a paste flux adhesive and with a powdered brazing metal, thence progressively applying to the so-coated strip edges, an overcoating of abrasive particles of a hard, high-melting diamond substitute material, thence progressively heating said strip at relatively low temperature to dry said paste flux and thence at temperature sufficiently high to austenitize said base metal and to fuse said matrix metal particles to one another and into a coating layer on said base metal, partially embedding said abrasive particles therein, thence progressively cooling said strip to temperature sufficiently low and with sufficient rapidity to transform said austenite to martensite and to solidify said matrix metal layer and permanently to bond the same to said base metal and to retain said abrasive particles permanently embedded in said matrix metal layer, thereafter progressively subjecting said strip to a tempering heat treatment, and thereafter punching out portions of said strip along the opposite edge thereof to form the lower profiles of said series of said saws and/or to sever said strip into finished saber saws.

Fig. 16.

METHOD FOR PRODUCING ARMORED SABER SAWS

This application is a continuation-in-part of copending application Ser. No. 703,931, filed Feb. 8, 1968.

This invention pertains to the production of saws and more especially saber saws, and to novel methods and apparatus for producing them in quantity, said saws so produced being characterized by the application of an armoring coating to one edge to form a cutting edge.

The armored saber saws of the invention comprise a flexible strip of a suitable base metal, such as a heat treatable steel or alloy steel shaped to provide shank and blade portions, the blade portion having an armoring coating applied to an edge thereof which is produced in situ from powdered metal particles of a hard, refractory brazing or matrix metal or alloy, such as nickel-base or cobalt-base alloys, and abrasive particles of hard, high melting material, such as metal carbides or equivalent diamond substitute materials, which coating comprises a relatively thin, adherent and homogenous layer of substantially uniform thickness of said metal powders fusion bonded to each other and to said base metal and alloyed or interdiffused with said base metal throughout an interlayer between said base metal and coating layer, said coating layer of said fusion-bonded metal powders having embedded therein and projecting from the surfaces thereof, a multiplicity of said abrasive particles to provide sharp cutting edges for cutting or abrading applications.

For the quantity production of armored saber saws according to the methods of the invention applicable thereto, a strip of a suitable heat treatable steel as specified below, of a length suitable for coiling and of a width and thickness appropriate for punching into the configuration of saber saws, is initially profile punched along one edge at regularly spaced intervals such as to form the top profiles of a series of such saber saws including the blade and mounting end or shank of each. The strip is also hole punched intermediate its edges and at correspondingly spaced intervals for alignment purposes during subsequent punching, as explained below. The thus-prepunched strip is then degreased and grit blasted along the top edge to provide a clean matte surface for application of the armoring coating. The strip is then run through a coating and heat-treating apparatus for applying an armoring coating to unpunched portions of the top edge, no coating being applied to the punched profiles.

The armoring according to a preferred method of the invention, consists in progressively feeding the strip with the profile punched edge uppermost, beneath a grooved applicator roll of a coating apparatus for applying to the unpunched upper edge portions of the strip, a coating of a flux adhesive admixed with the brazing metal powders. The so-coated strip is then fed beneath a falling curtain of the abrasive metal particles, such tungsten carbide grits, a thin layer of which is thus deposited on the previously applied layer of flux paste and brazing metal powders. Alternatively, the paste flux adhesive and the brazing metal powders may be applied in successive coats prior to overcoating with the abrasive particles.

The so-coated strip is fed thence past an air blast for removing nonadhering abrasive particles and thence through a drying oven for drying the armoring coating. The strip is then fed through a high-frequency induction heating coil for fusing the brazing metal powders into a thin layer partially immersing the abrasive particles therein, and for austenitizing the base metal of the strip. The strip is then fed through an inert atmosphere, quenching apparatus for cooling and solidifying the brazing metal thus permanently to partially embed the abrasive particles therein and for bonding the brazing metal to and alloying it with the underlying surface of the base metal strip. This quenching treatment also transforms the austenitic structure of the base metal strip into martensite, thus quench hardening the same. The strip is next fed through a tempering furnace for tempering the base metal to a desired degree of hardness and ductility.

The thus-armored strip is then subjected to a second punching operation to form the back profile of the saber saws in some modifications, and as to all modifications, to sever the strip into finished saber saws. The severing operation is made through portions of the strip which are not armored to prevent damage to the punch and die elements.

In the accompanying drawings:

FIGS. 1–3, inclusive, illustrate the successive steps in the production of armored saber saws in accordance with one modification of the invention, from steel strip base stock as the starting material, wherein: FIG. 3 is a plan view of one of the finished saws as produced by the sequence of steps illustrated in FIGS. 1 and 2.

FIGS. 4–6, inclusive, 7–9, inclusive, and 10–12, inclusive, are views similar to FIGS. 1–3, inclusive, respectively, illustrative of the production of armored saber saws in accordance with other modifications of the invention.

FIG. 14 is an enlarged view in front sectional elevation of a punch and die assembly for punching the steel strip base stock in accordance with the top profiles of a series of saber saws of the modification shown in FIG. 3; while

FIG. 17a is a view in longitudinal sectional elevation, as taken at 17a—17a of FIG. 17b, of certain components of the apparatus shown schematically in FIG. 16, for induction heating and thence cooling the armored strip stock; while FIG. 17b is a transverse sectional view thereof as taken at 17b—17b of FIG. 17a.

Figure 1:
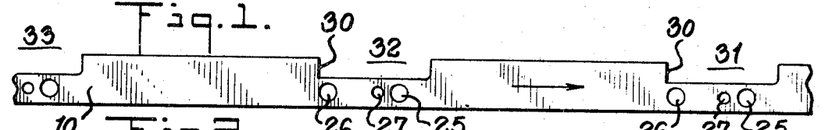
FIG. 1 is a plan view of a length of the strip base stock as profile blanked along one edge at regularly spaced intervals to form the top profiles of a series of saber saws, and also as hole punched near the lower edge for purposes above mentioned.
Figure 13:
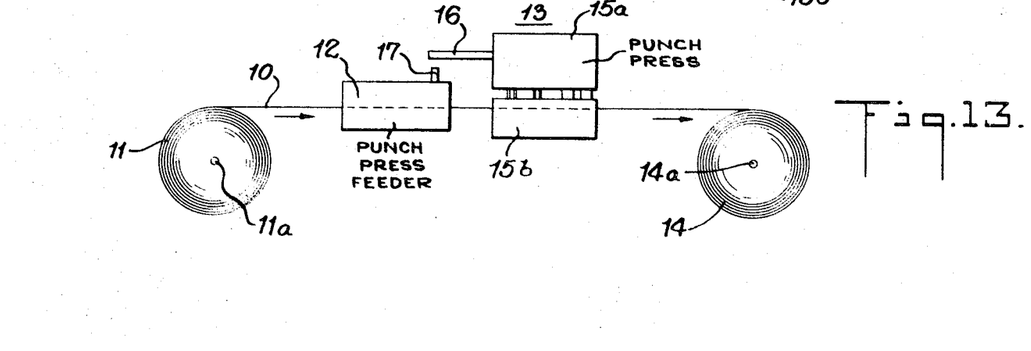
FIG. 13 is a diagrammatic showing in side elevation of a suitable form of apparatus for feeding and punching the steel strip base stock before and after armoring in the manner above described.

Referring to FIG. 1 in conjunction with FIG. 13, the steel strip base stock 10 for producing saber saws according to the FIGS. 1–3 sequence, is fed from a coil 11 thereof mounted on an unwind reel 11a, thence through a pneumatically actuated punch press feeder 12, and thence through a punch press 13, both of conventional design, and thence is wound into a coil 14 on a rewind reel 14a. The punch press feeder 12 (which may be of the type sold by Mechanical Tool & Engineering Company, Rockford Ill., under the name of "Rapidair") advances the strip 10 in intermittent steps of equal length each, through the punch press 13, comprising punch block and die block assemblies 15a and 15b as hereinafter described with reference to FIGS. 14 and 15. The punch block assembly is reciprocated up and down in conventional manner and has integral therewith an arm 16, which on its downward stroke engages a valve control element 17, of the punch press feeder, and correspondingly disengages the same on its upward stroke. Operation of the punch press feeder is such, as is well understood in the art, that when the punch press arm 16 disengages the valve control 20 on the punch press up stroke, the punch press feeder is actuated to lightly grip and advance the strip 10 in the direction of the arrow a preselected length. Conversely, when the arm 16 engages the valve control 17 on the punch press down stroke, the punch press feeder is actuated to tightly grip the strip 10 in a locked position during the actual punching operation.

Referring now to FIG. 14 in conjunction with FIGS. 1 and 13, the punch block assembly 15a includes a punch holder 17a which is provided at this stage of operations with a pair of piercing punches 18 and 19 of equal diameter and with a further punch 20 of smaller diameter, which function in conjunction with complementary dies mounted in die holder 18a of the die block assembly 15b as at 21, 22 and 23, to punch holes in the strip 10, in the relative diameters and positions shown at 25, 26 and 27 of FIG. 1. The punch holder also mounts a further punch 28, which functions in conjunction with a die 29 of the die holder, to punch or blank out sections on the top edge of the strip in the relative position to the holes 25–27, inclusive, as shown at 30 of FIG. 1.

As further shown in FIG. 14, the stripper plate 18b of the die block assembly 15b, is provided with a slot 10a through which the strip 10 is intermittently fed in the direction of the arrow by the punch press feeder. On each downstroke of the punch holder, the strip is punched and profile blanked in the manner aforesaid at equispaced intervals, as at 31, 32 and 33 of FIG. 1.

In order to insure proper alignment of the strip 10 both transversely and longitudinally thereof on each punching operation, the punch holder 17a also mounts a series of pointed alignment pins, as at 34, 35 and 36. These pins are so spaced as to enter successively on each down stroke of the punch holder, the previously punched series of three holes corresponding to holes 26, FIG. 1, as the strip is advanced through the punch press. It will be observed from FIG. 14, that these pins project below the punches and thus enter the punched holes slightly in advance of the actual punching operation. In this connection, as was previously pointed out, the punch press feeder in advancing the strip 10 to each succeeding punching position, lightly grips the strip for a sufficient interval prior to gripping the same tightly for the actual punching operation, as to permit the alignment pins to enter the punch holes and align the strip prior to punching.

Figure 2:
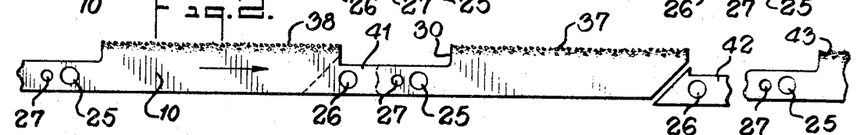
FIG. 2 is a view of FIG. 1, showing armoring of the unpunched portions of the upper strip edge, and also showing the subsequent punching of the lower strip edge to sever the strip into a series of finished saber saws.

The strip 10 as thus punched and blanked as shown in FIG. 1, is degreased and grit blasted along and adjacent its top edge to provide a clean matte surface for application of an armoring coating. An armoring coating is next applied along the unpunched portions of the top edge of the strip in the manner above mentioned and hereinafter explained more in detail, but no coating is applied to the punched profiles 30. The armored edge portions are illustratively shown at 37, 38, etc., of FIG. 2.

Figure 15:
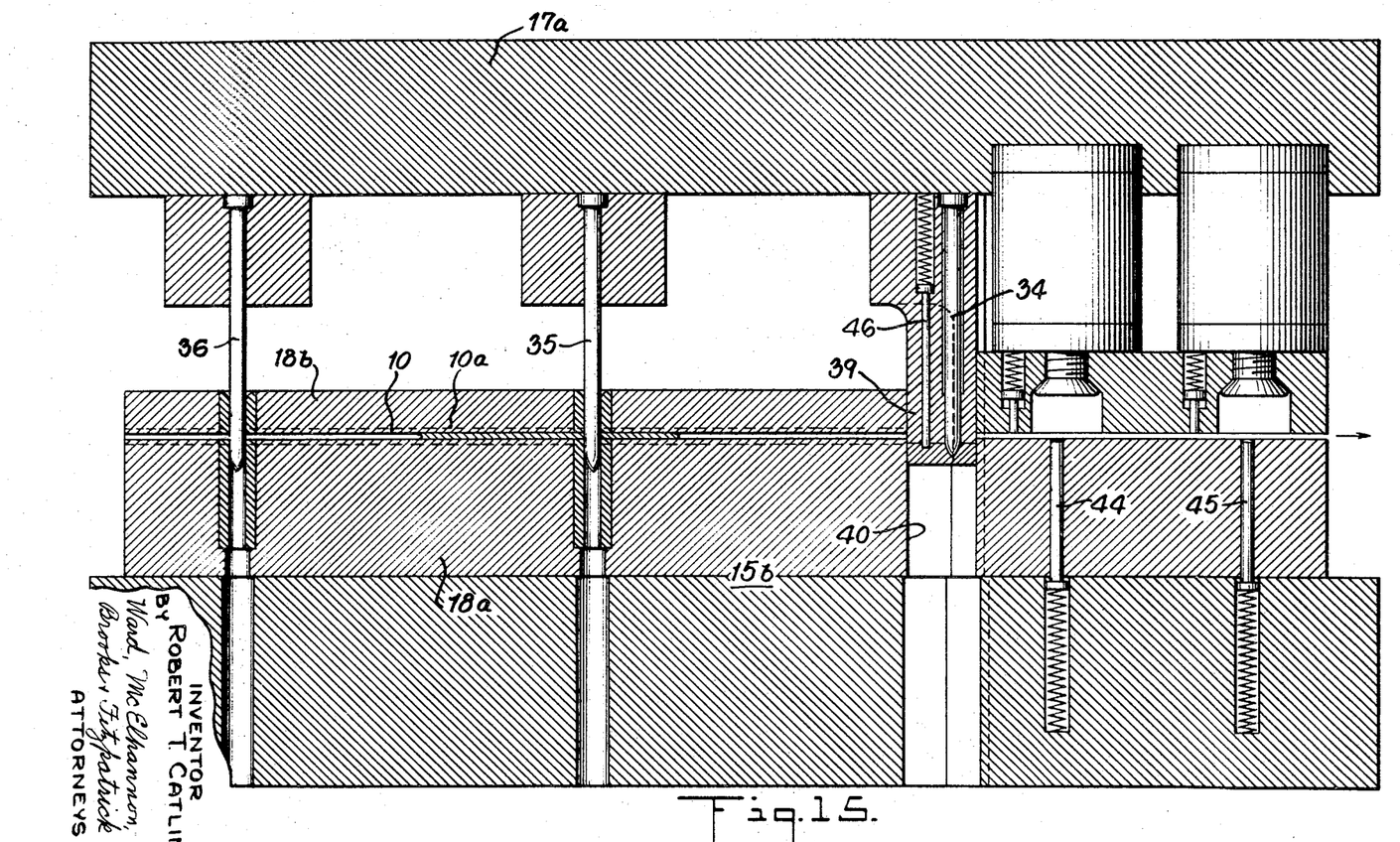
FIG. 15 is a similar view of a punch and die assembly for punching the bottom profiles thereof and/or severing the strip into a series of finished saws. These views are illustrative with minor modifications as discussed below, of punch and die assemblies for the top and bottom punching, respectively, of the strip stock in forming the saber saws of all of the other modifications thereof illustrated in FIGS. 6, 9 and 12 of the drawings.

The strip 10 as thus far processed is now fed again through the punch press in the manner shown in FIG. 13, for profile punching the bottom edge of the saber saws and/or for severing the strip into finished saws. For this purpose, the punch press is arranged as shown in FIG. 15. The punch and die holders 17a, 18a, mount punch and complementary die elements 39 and 40 of shapes for punching out sections of the strip stock 10 as shown within the dotted area 41, FIG. 2, and as shown completely punched out at 42 thereof. The strip is thus punched into finished saws, one of which is shown at 43, FIG. 3.

In the FIG. 15 punch assembly, the alignment pins 35, 36 are arranged to enter the holes corresponding to the holes 26, FIG. 1, previously punched in the strip, in advance of the punching position of punch 39, while pin 34 enters the hole contained in the area to be punched out. Spring-mounted pins supported in the die holder 18a, as at 44, 45, bear against the underside of the strip 10, while a spring-mounted pin 46 mounted in the punch 36 cooperates therewith to disengage the punched sections 42, FIG. 2, from the severed saws 43.

Figure 16:
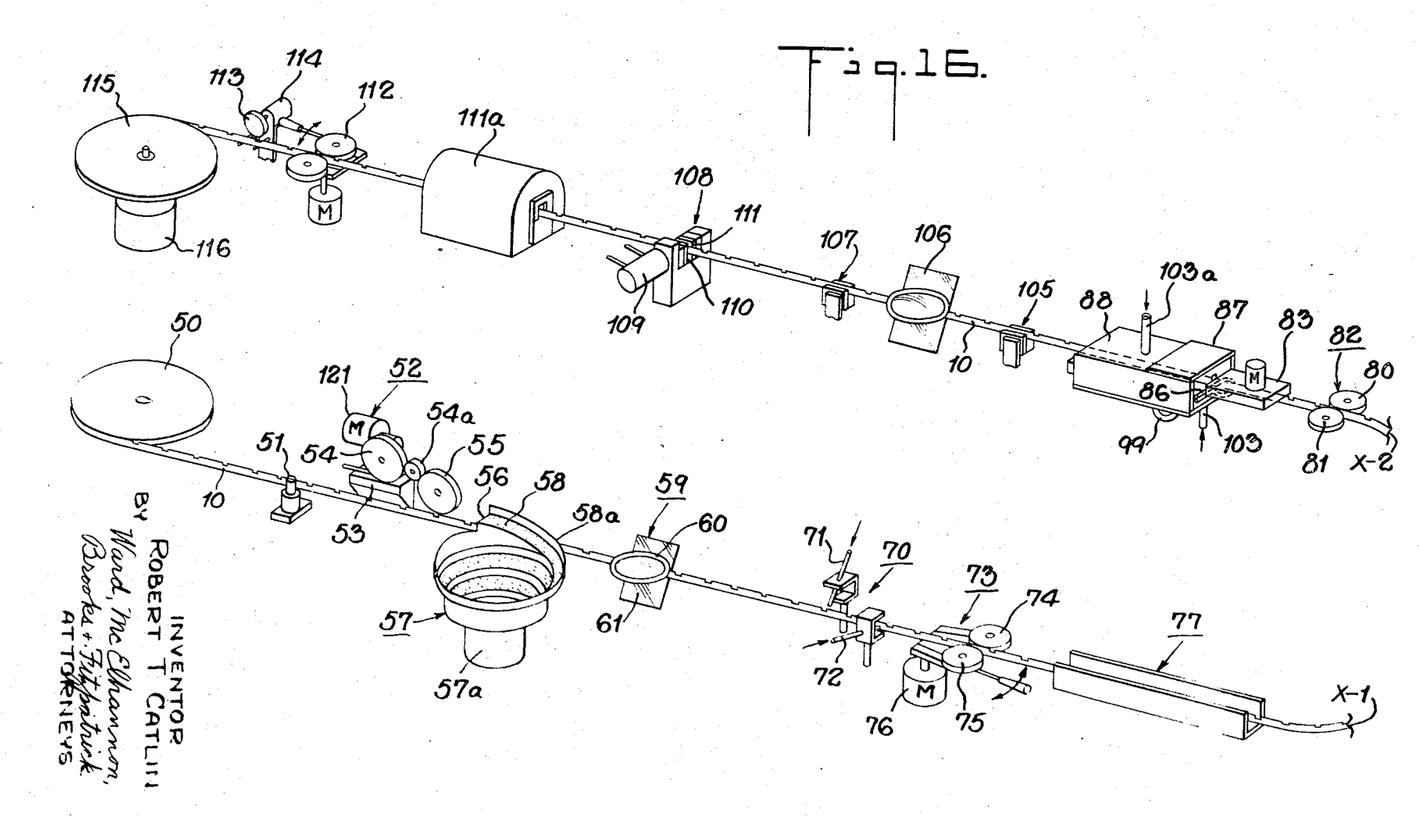
FIG. 16 is a diagrammatic showing in perspective of an apparatus and sequence of operations for applying armoring coatings to the nonpunched upper edge portions of the steel strip base stock as initially profile punched along the top edge.

Referring now to FIG. 16 in conjection with FIG. 1, the armoring of the unpunched top edge portions as at 37, 38 of the strip stock 10 as processed to the condition shown in FIG. 1, is accomplished in the following manner. The strip is fed from a reel 50 thereof in vertically disposed position with reference to its height with the blanked edge at the top, first through a guide 51 and then beneath a peripherally grooved applicator roll 55, of a coating unit 52, for applying to the upper edge of the strip a coating comprising an admixture of paste flux and brazing metal powders contained in a reservoir 53 and transferred thence to roll 55 via pickup and transfer rolls 54 and 54a, respectively.

A suitable paste flux for this purpose is that put out by Wall Colmonoy Corporation, Detroit, Mich., under the designation "Nicrobraz Flux," as suitably thinned with water, and which is boride-fluoride flux. Alternatively, organic adhesives may be employed as described in U.S. Pat. Nos. 3,024,128 and 3,023,490, C. H. Dawson.

Suitable brazing metal powders for admixture with the paste flux are powdered, hard, refractory alloys, such as nickel-base or cobalt-base alloys, capable of providing a matrix metal which wets the surface of and bonds to the tungsten carbide or other diamond substitute particles and which also fusion bonds to or alloys with the strip base metal. Suitable such alloys are the cobalt-base and nickel-base alloys, such as the cobalt-chromium-tungsten "Stellite" alloys or the nickel-base alloys put out by the aforesaid Wall Colmonoy Corporation under the designation "Nicrobraz." A preferred such alloy is its "LM Nicrobraz" comprising an alloy consisting of about 6.5% Cr, 3.0% B, 4.5% Si, 2.5% Fe, 0.15% C max., and the balance Ni.

The strip as thus coated along its unpunched upper edge portions with the aforesaid admixture of flux paste and brazing metal powders, is now fed beneath the discharge lip 56, of a vibratory feeder 57 of spiral construction. This unit is vibrated at high frequency by conventional means (not shown) enclosed in the base housing 57a. The spiral trough of the vibrating unit contains a mass of diamond substitute particles 58, such as tungsten carbide grits, which by virtue of the vibration of the unit, are fed upwardly along the spiral trough 58a and discharged over the discharge lip 56 thereof in a thin layer which falls as a curtain of the powdered particles transversely across the upper edge of the strip 10. A thin layer of the carbide particles is thus deposited onto the sticky coating applied as above to the upper edge of the strip, as limited, however, to the extent of the adherence of the carbide particles to said coating.

The strip is fed thence past an inspection station 59 consisting of an illuminated magnifying system 60 used in conjunction with a mirror 61 for inspection and quality control of the coated strip edge. The mirror is set at an angle of about 45° to the vertical so that an observer may observe both the back as well as the front surfaces of the strip.

The strip is fed next past an air blast unit 70, consisting essentially of a pair of nozzles 71, 72, adjustably positionable for blowing air at relatively low pressure against opposite sides of the strip below the coated edge thereof for removing loose tungsten carbide particles that may be deposited in the punched out portions of the strip or otherwise loosely adhering to the strip at this stage.

Next, the strip passes to a drive unit 73 and between a pair of pinch rolls 74, 75 thereat, driven by a motor 76, wherein the strip is pulled from the takeoff reel 50 and through the apparatus previously described. The strip passes thence through a troughlike, infrared-ray heating unit 77, wherein the paste flux of the armoring coating is thoroughly dried.

Thence, the strip passes between a pair of rolls 80, 81 of a tensioning unit 82, which tensions the strip at this point against the pull of a motor-driven strip feed unit 112 at the end of the strip traverse. From the tensioning unit 82, the strip passes beneath a motor-driven exhaust blower 83 for purposes described below.

Figure 17A:
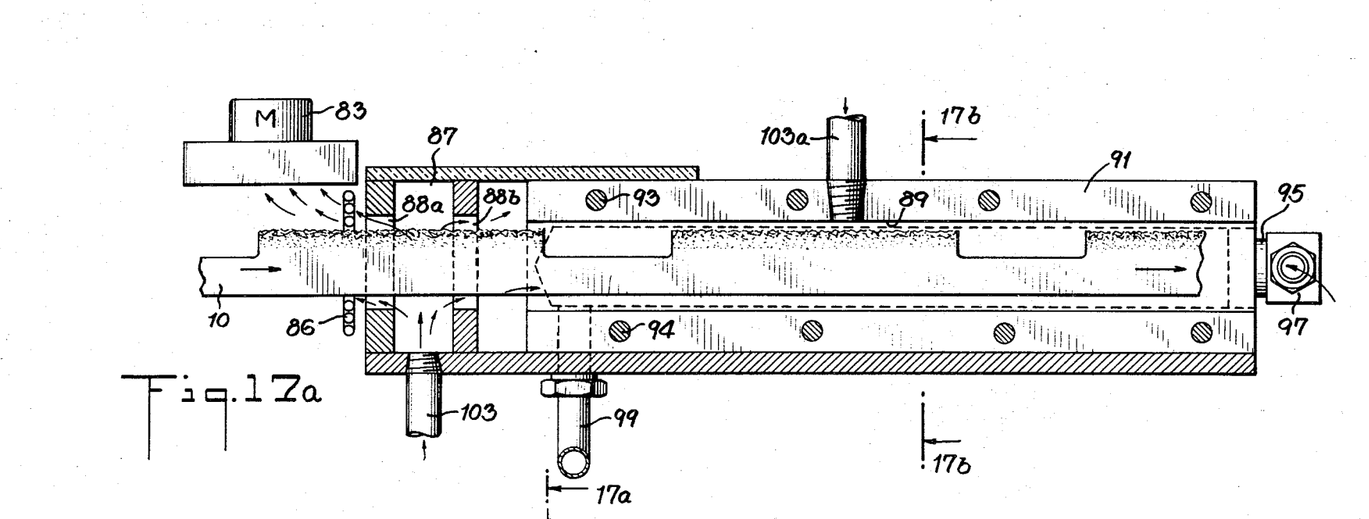

Referring now to FIGS. 16 and 17a, the strip passes thence through an induction heating coil 86, supplied with high-frequency electrical current, a suitable frequency being, for example, about 5.2 megacycles per second, for heating the strip to temperature of about 1,900°–2,000° F., such as to cause the brazing metal powder to fuse and alloy with the base metal of the strip at the interface between them, also to embed the carbide particles therein and also to austenitize the alloy steel base metal of the strip. It has been found that the magnetic field of the induction heating coil has the effect of causing the carbide particles to project from the surface of the brazing metal and thereby enhance the cutting action of the so-armored tool.

Reverting now to the exhaust blower 83, its function is to draw air, smoke and flux vapor fumes from and through the induction heating coil 86, to prevent accumulation thereat of a conductive atmosphere such as might produce a flashover between the coil and the strip stock.

Figure 17B:
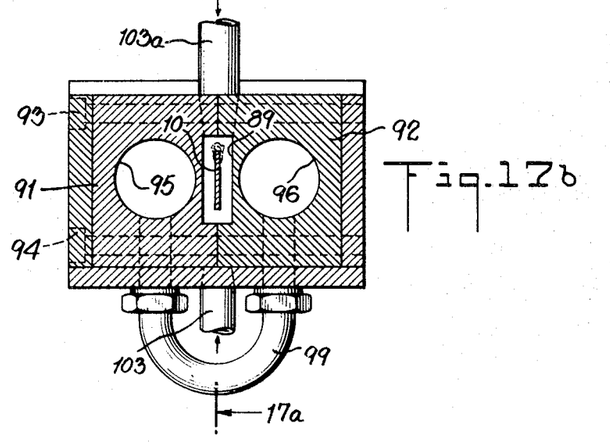

The strip passes next, referring to FIGS. 16, 17a and 17b, through a controlled atmosphere chamber 87, through entrance and exit slots 88a 88b therein, and passes thence through a longitudinal slot 89 formed between a pair of grooved, metal chill plates, 91, 92, bolted together, as at 93, 94. The plates are made of a metal of high thermal conductivity, such as copper, aluminum or equivalent, and are chilled by circulation of a coolant, such as cold water, circulated therethrough by passages therein, as at 95, 96, connected at one of each to inlet and outlet pipes, as at 97, and at the opposite ends through a U-shaped coupling pipe 99. The atmosphere chamber 87 is filled with a substantially inert gas, such as nitrogen, injected therein via a pipeline 103, and which flows out of the chamber through the strip feed entrance and exit slots 88a, 88b. The gas flow through the exit slot 88b passes thence through the slot 89 between the chill plates to the exit end thereof. Additional nitrogen is injected into slot 89 via pipe 103a. The nitrogen gas flow as described, protects the strip 10 against oxidation and scaling while in a heated state. It will be noted in this connection, that the nitrogen gas flowing through the entrance slot 88a also flows through and about the induction heating coil 86.

As the strip is fed along the slot between the chill plates, it is subjected to a rapid cooling action for two purposes. One is to solidify the fused matrix metal, thereby to form a permanent coating thereof alloyed with and bonded to the base metal and in which the carbide or other diamond substitute metal particles are permanently embedded. The other purpose is to transform the high temperature austenitic structure of the steel alloy base metal into a hard, fully martensitic structure which may thereafter be tempered to a desired lower degree of hardness with accompanying increased ductility and toughness. However, in order to accomplish this, the steel strip 10 must be cooled from the austenitic phase with sufficient rapidity to temperature below the lowermost nose of the time-temperature-transformation or "TTT" curve of the steel as to prevent transformation of the austenite into any of the higher temperature transformation products such as pearlite, ferrite, bainite, etc. A suitable material for the strip stock 10 is SAE 6150 steel, the lower nose of the "TTT" curve of which occurs at about 750° F. It is, therefore, necessary to cool the steel strip down to about 700° F. with sufficient rapidity, i.e., in about 4 seconds, to get past the transformation curve while still retaining the steel in the fully austenitic state. Thereupon, the steel is air-cooled down to ambient temperature with transformation into a fully martensitic structure and with a minimum of quenching stress. In the normal cycle of operation of the FIG. 16 strip feed rate, several minutes are available for such air cooling for cooling the strip below about 200° F. as it passes from the chill plates to a subsequent tempering furnace 111a in which time the transformation of the austenite to martensite is substantially complete. The resultant hardness imparted to the steel strip is about "C" 60 Rockwell.

Reverting to FIG. 16, the strip 10, on exiting from the chill plate slot 89, passes next through a guide block 105 and under an inspection station 106, which is similar to inspection station 59, and thence through a tensioning unit 108. This unit is controlled by a hydraulic cylinder 109 for pressure actuating a movable brakeshoe 110 toward a fixed brakeshoe 111, with the strip 10 passing between said brakeshoes. The strip 10 passes next through the tempering furnace 111a, for tempering treatment at about 950° F. which tempers the base metal down to about "C" 40-45 Rockwell.

The strip passes next through the rolls of a drive unit 112, similar to unit 73, and thence under a roller 113 of a counter 114 and thence onto a takeup reel 115 driven by a motor 116.

Since the untempered martensitic structure of the steel strip as it leaves the quenching unit 87 is quite brittle, it is desirable to avoid bending the strip prior to tempering. Hence, the strip is fed in a straight path between units 82 and 112.

Figure 18:
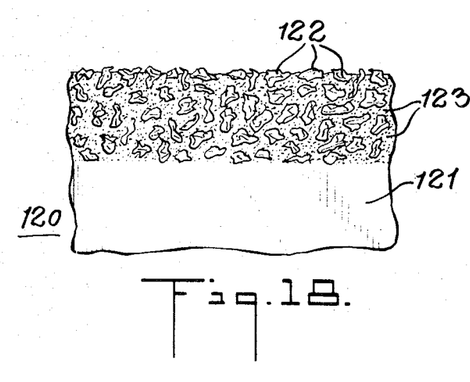
FIG. 18 is an enlarged fragmentary plan view of a section of the armored strip stock as produced in accordance with the FIG. 16 sequence of operations.

A small section of the armor coating applied to the strip 10 as processed in accordance with the FIG. 16, sequence, has the appearance as shown in enlarged view in FIG. 18 at 120. Referring thereto the base metal of the saw is shown at 121, the carbide particles are shown typically at 122 embedded in the brazing metal 123 and projecting therefrom as shown to form sharp cutting edges.

In order to assure that the carbide or other diamond substitute particles will project beyond the matrix layer to form a series of sharp cutting or abrading edges, the carbide particles are of a grain size substantially exceeding the thickness of the matrix coating layer. Preferably, the thickness of the matrix coating layer does not exceed about one-half to two-thirds the average transverse dimensions of the abrasive particles, whereby said abrasive particles project beyond said coating layer to an average extent of about one-third to one-half their average transverse dimensions. The thickness of the matrix coating is controlled to some extent by the grain size of the brazing metal powders. Hence, the carbide or other diamond substitute abrasive particles should also substantially exceed in grain size, the dimensions of the brazing metal powders.

A suitable grain size for the brazing metal powders is about 150 mesh, i.e., 0.0041 inch, or under. For the carbide or equivalent diamond substitute particles, suitable grain sizes are about 30-40, 50-70 and 70-100 mesh, referring to mesh sizes as determined by the ASTM specification E11 of 1958. A preferred grain size for the diamond substitute particles is about 30-40 mesh. In round numbers, the grain size of the matrix metal particles is about 0.004 inch and under, and that for the abrasive particles about 0.006-0.02 inch, and may range up to about 0.025 inch.

The brazing or matrix metal is preferably a hard, refractory metal alloy, of noneutectic character, having a substantial softening or plastic temperature range between liquidus and solidus points, below the melting point of the strip base metal and within the temperature range of about 1,500°-2,400° F. As above stated, suitable such alloys are of the cobalt-base or nickel-base types, such as the nickel-base alloys containing about 5-15% Cr, 1-3.5% B, 2-5% Fe, without and with silicon up to about 5 to 10%, and carbon up to about 0.25%, having brazing temperatures within the range of about 1,700°-2,200° F. The cobalt-base "Stellite" alloys are also suitable, containing about 40-80% Co, 20-35% Cr, 0-25% W, 0-3% Si and 0.75-2.5% C.

Figures 3, 4:
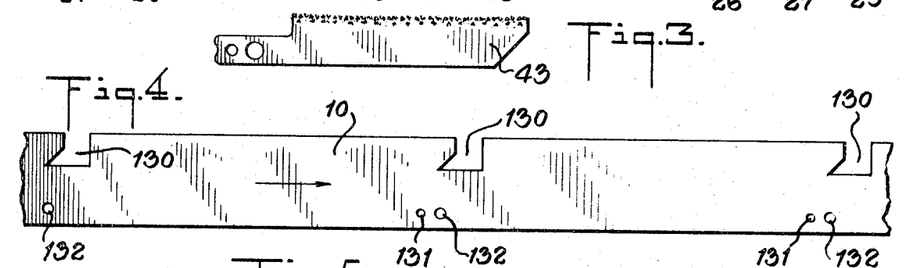
Figure 4:
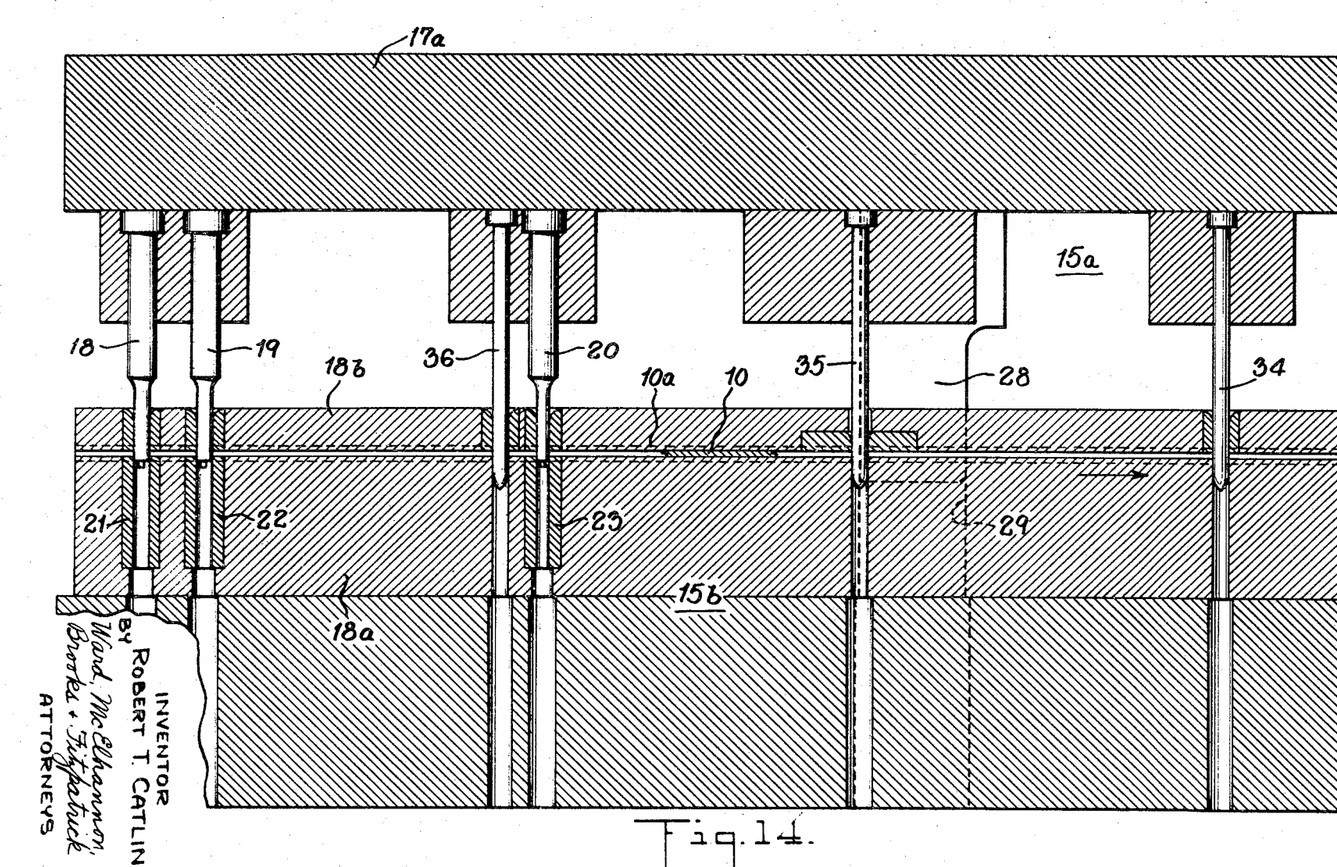
Figure 5:
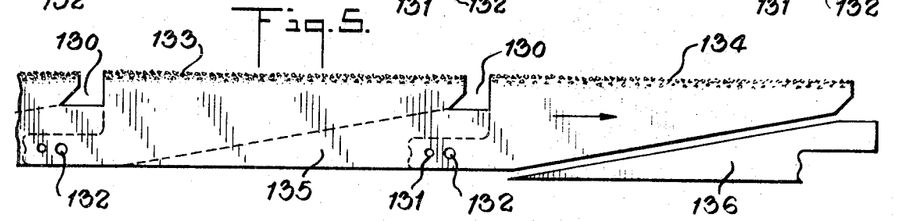
Figures 6, 7:
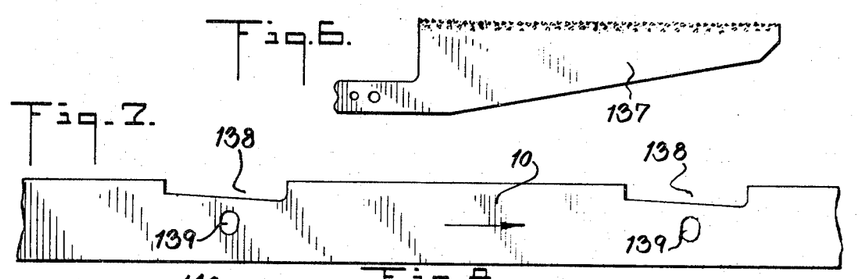

Referring now to FIGS. 4-6, inclusive, for producing saber saws in accordance with this construction, the steel strip base stock 10 is initially top profile punched along its upper edge, as at 130, and hole punched, as at 131, 132, FIG. 4, the punch press of FIG. 14 being appropriately modified to accomplish this. The unpunched top edge portions are thereupon armored as at 133, 134, FIG. 5. The bottom portion of the strip 10 is thereupon punched to punch out portions within the dotted line area 135 of FIG. 5, thus to form the bottom profiles of the saw blades and to sever them into finished blades by the punched out portions, as at 136, one of the finished saws being as shown at 137, FIG. 6. For this bottom-punching operation, the punch assembly of FIG. 15 is employed as appropriately modified.

Figures 8, 9:
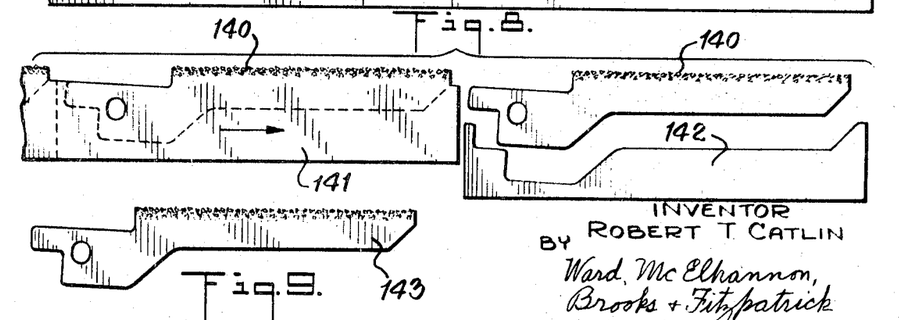

In the modification of FIGS. 7-9, the strip stock 10 is initially profile punched along the top edge as at 138, and hole punched as at 139, only one hole being punched for each profile punching as shown. The strip is next armored as at 140, FIG. 8, and then bottom punched to punch out portions as shown within the dotted line area 141, and as shown blanked out at 142, to sever the strip and form the finished saws as shown at 143, FIG. 9.

Figure 10:
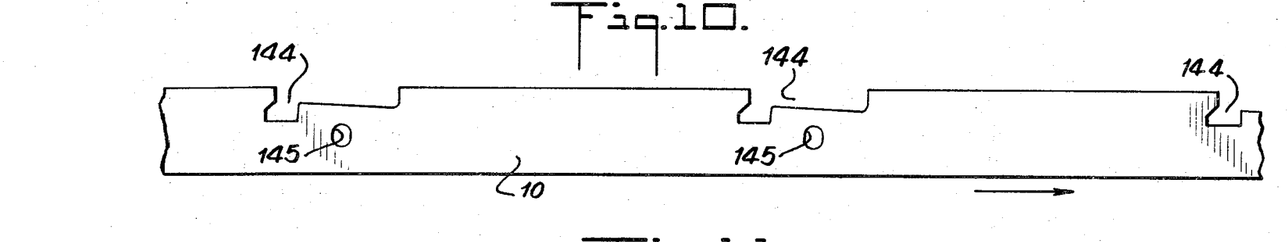
Figures 11, 12:
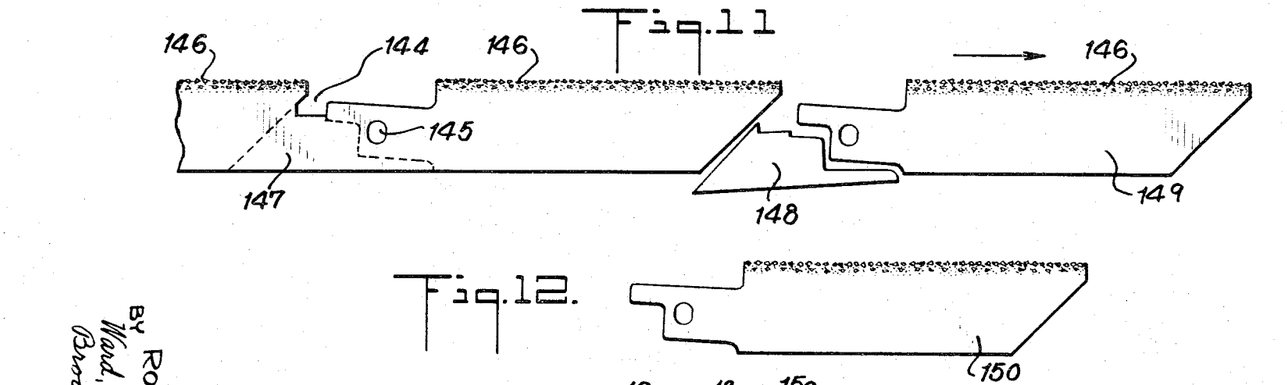

In the embodiment of FIGS. 10–12, the strip 10 is first top profile punched, as at 144, and hole punched, as at 145, FIG. 10. The unpunched top edge portions are then armored, as at 146, FIG. 11. The strip is then bottom punched to punch out portions as shown within the dotted line area 147, and as punched out at 148, FIG. 11, to form the bottom profile of the saw blades and to sever the strip into the finished saws, as shown at 150, FIG. 12.

What is claimed is:

1. The method for the quantity production of armored saber saws from a long flexible strip of a steel base metal, which comprises: progressively punching out portions of said strip along one edge thereof at equispaced intervals to form the upper profiles of a series of saber saws comprising shank and blade portions of each, progressively coating said blade portions with a paste flux adhesive and with a high-melting, powdered brazing metal selected from the group consisting of nickel-base and cobalt-base alloys, thence progressively applying to the so-coated blade portions an overcoating of abrasive particles of hard, high melting, metal carbides, thence progressively heating said strip at temperature sufficiently high to fuse said brazing metal particles to one another and into a coating layer bonded to and alloyed with said steel base metal with said brazing metal partially embedding said abrasive particles therein and with said particles projecting therefrom in a myriad of sharp cutting edges, thence progressively cooling said strip to temperature sufficiently low to solidify said brazing metal layer and permanently to bond and alloy the same to said base metal and to retain said abrasive particles permanently embedded in said brazing metal layer, and thereafter progressively punching out portions of said strip at equispaced intervals along the opposite edge thereof to form the lower profiles of said series of said saws and to sever said strip into finished saber saws.

2. The method according to claim 1, wherein said blade portions are progressively coated with said paste flux adhesive admixed with said powdered brazing metal.

3. The method according to claim 1, wherein said blade portions are progressively and successively coated first with said paste flux adhesive and thence with said powdered brazing metal.

4. The method according to claim 3, wherein a thin layer of said admixture of paste flux adhesive and powdered brazing metal is progressively rolled onto said strip edges and the strip fed thence beneath a falling curtain of said abrasive metal particles for overcoating said layer therewith.

5. The method according to claim 1, wherein said abrasive particles have a grain size substantially exceeding the grain size of said matrix metal particles.

6. The method according to claim 1, wherein the thickness of said brazing metal layer is so controlled as not to exceed one-half to two-thirds the average transverse dimensions of said abrasive particles, whereby said abrasive particles project beyond said matrix layer to an average extent of about one-third to one-half their average transverse dimensions.

7. The method according to claim 1, wherein the thickness of said brazing metal layer is so controlled as to range from about 0.002 to 0.01 inch and wherein the particle size of said abrasive particles is such that they project above said base metal by about 0.01 to 0.025 inch.

8. The method according to claim 1, wherein said brazing metal particles are fusion bonded by high-frequency electrical induction heating and thence cooled in a substantially nonoxidizing atmosphere.

9. The method according to claim 1, wherein said abrasive particles have a grain size of about 0.006 to 0.025 inch and wherein said brazing metal particles have a grain size of about 0.004 inch and under.

10. The method according to claim 1, wherein said strip is made of a heat treatable steel and wherein said heating austenitizes said steel and wherein said cooling is to temperature sufficiently low and is conducted with sufficient rapidity to transform said austenite to martensite.

11. The method according to claim 1, wherein concurrently with said upper profile punching of said strip, it is also hole punched at equispaced intervals and the strip aligned by pin penetration of said holes prior to each successive punching operation.

12. The method according to claim 11, wherein said strip is longitudinally advanced in equal lengths between successive punching operations, is thence slidably gripped in arrested state and slidably aligned by pin penetration of said holes, and thereupon the strip is tightly gripped and punched.

* * * * *